(No Model.)
O. W. GOSLEE
Tobacco Hoe.
No. 233,849.          Patented Nov. 2, 1880.
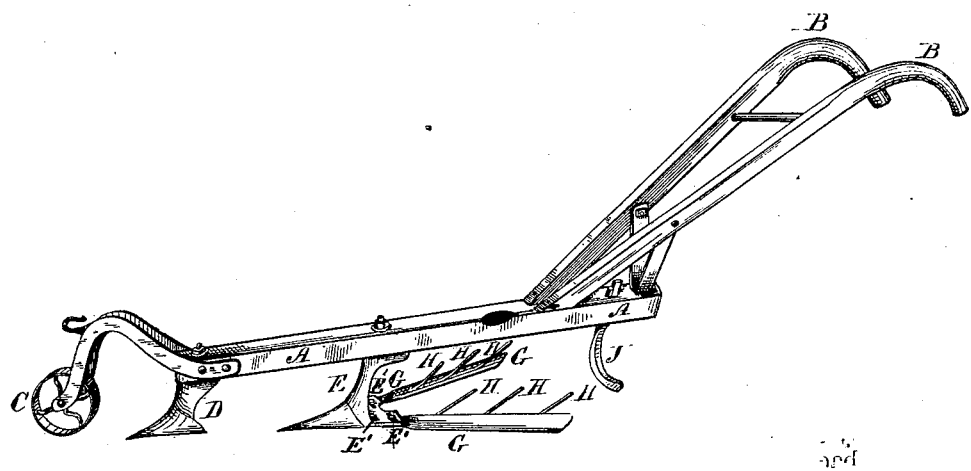
Witnesses
Wendell R. Curtis
Wilmot Horton
Inventor
Ozias W. Goslee
by Theo. G. Ellis, Attorney

UNITED STATES PATENT OFFICE.

OZIAS W. GOSLEE, OF GLASTONBURY, CONNECTICUT.

TOBACCO-HOE.

SPECIFICATION forming part of Letters Patent No. 233,849, dated November 2, 1880.

Application filed July 27, 1880. (No model.)

*To all whom it may concern:*

Be it known that I, OZIAS W. GOSLEE, of Glastonbury, in the county of Hartford and State of Connecticut, have invented certain new and useful Improvements in Tobacco-Hoes; and I do hereby declare that the following is a full, clear, and exact description thereof, whereby a person skilled in the art can make and use the same, reference being had to the accompanying drawing, and to the letters of reference maked thereon.

My improvement relates to hoes or cultivators, especially to such as are used in the cultivation of tobacco-plants.

The object of my invention is to provide a better and more effective implement for removing weeds from around the plants, and at the same time loosen up the ground and promote the growth of the tobacco.

In the accompanying drawing, which illustrates my invention, A is the beam of my improved cultivating implement or hoe. B B are the handles by which it is guided by the operator.

C is a roller at the forward end of the beam, which rolls upon the surface of the ground and guides the forward end of the beam. This roller can be set higher or lower, as desired, so as to allow the implement to enter a greater or less depth into the ground.

D is a blade of the ordinary form of cultivator-tooth. It serves to loosen the ground in the middle of the space between the rows of plants, and at the same time steadies the forward end of the beam and prevents any lateral movement. E is a similar tooth farther back on the beam to which my improvements are attached.

G G are two long blades or knives, which project laterally, and are joined to the tooth E by means of the bolts E' moving in slots, so that they can be set at any desired angle. These blades are intended to run below the surface of the ground and parallel to it, and they are slightly inclined, so as to lift and loosen the ground above them.

H H, &c., are fingers attached to the blades G and projecting upward nearly or quite to the surface of the ground. They serve as an upward-acting rake to unroot the weeds and throw them upward out of the ground. Three of these fingers on each side are shown in the drawing; but there may be more of them attached to the blades G, or they can be dispensed with, if desired.

J is a cutter projecting downward from the rear end of the beam A. Its purpose is to guide and steady the rear end of the implement and prevent it from being thrown to one side or out of the line between the plants by the long blades striking against any obstacle, or from their unequal resistance in the ground.

The improved implement herein described is intended to be drawn by a horse and guided in the usual manner by means of the handles.

A great variety of forms of plows, cultivators, &c., have been heretofore in use for various agricultural purposes, none of which I wish to claim as my invention; but What I do claim as an improvement in such implements is—

1. The blades G, attached to and supported by the tooth E, in combination with the tooth E and the beam A, said blades being adjustable horizontally by means of the bolts and slots E', substantially as described.

2. The combination of the blades G, the supporting-tooth E, the beam A, and the guide J in the rear of the tooth E, to form a cultivating device, substantially as described.

3. The combination of the tooth D, the supporting-tooth E, with the blades G, and the guide or cutter J, with the beam A and the roller C, substantially as described.

OZIAS W. GOSLEE.

Witnesses:
H. C. SMITH,
THEO. G. ELLIS.